(12) United States Patent
Marsden

(10) Patent No.: US 12,169,041 B2
(45) Date of Patent: Dec. 17, 2024

(54) METHOD OF INHIBITING LEAKAGE OF A FLUID THROUGH A DEFECT IN A WALL OF A PIPE

(71) Applicant: ORIGIN TECH LTD, Gateshead (GB)

(72) Inventor: John Marsden, Gateshead (GB)

(73) Assignee: ORIGIN TECH LTD, Gateshead (GB)

( * ) Notice: Subject to any disclaimer, the term of this patent is extended or adjusted under 35 U.S.C. 154(b) by 105 days.

(21) Appl. No.: 17/772,417

(22) PCT Filed: Apr. 1, 2021

(86) PCT No.: PCT/GB2021/050818
§ 371 (c)(1),
(2) Date: Apr. 27, 2022

(87) PCT Pub. No.: WO2021/198696
PCT Pub. Date: Oct. 7, 2021

(65) Prior Publication Data
US 2023/0007987 A1 Jan. 12, 2023

(30) Foreign Application Priority Data
Apr. 3, 2020 (GB) ..................................... 2004981

(51) Int. Cl.
*F16L 55/1645* (2006.01)
*G01M 3/28* (2006.01)
(52) U.S. Cl.
CPC ....... *F16L 55/1645* (2013.01); *G01M 3/2823* (2013.01)

(58) Field of Classification Search
None
See application file for complete search history.

(56) References Cited

U.S. PATENT DOCUMENTS

| | | |
|---|---|---|
| 3,356,777 A | 12/1967 | Barrett |
| 4,584,963 A | 4/1986 | Morinaga et al. |
| 5,230,842 A | 7/1993 | Munde |
| 9,045,648 B2 | 6/2015 | Perstnev et al. |

(Continued)

FOREIGN PATENT DOCUMENTS

| | | | |
|---|---|---|---|
| GB | 212715 A | * 3/1924 | ......... G01M 3/2853 |
| GB | 2469580 B | 12/2011 | |

(Continued)

*Primary Examiner* — Peter J Macchiarolo
*Assistant Examiner* — Jermaine L Jenkins
(74) *Attorney, Agent, or Firm* — Barclay Damon LLP

(57) ABSTRACT

A method of inhibiting leakage of a fluid through a defect (4) in a wall of a pipe (2), comprising the steps: introducing a loss control medium (30) into a first portion of a pipe (2); conveying the loss control medium (30) along the pipe from the first portion to a second portion of the pipe, wherein the second portion is embedded in a porous medium and has a defect (4) through which fluid conveyed by the pipe during normal use leaks into the porous medium; and applying a pressure to the loss control medium (30) such that at least a portion of the loss control medium (30) is expelled from the pipe through the defect (4) into the porous medium thereby causing the loss control medium to accumulate within the porous medium in the vicinity of the defect which inhibits flow of a liquid through the defect into the porous medium.

23 Claims, 13 Drawing Sheets

(56) References Cited

U.S. PATENT DOCUMENTS

| | | | | |
|---|---|---|---|---|
| 9,738,798 B2* | 8/2017 | Perstnev | ................ | F16L 55/18 |
| 10,302,236 B2* | 5/2019 | Perstnev | .................. | C08K 3/36 |
| 10,683,959 B2* | 6/2020 | Kiest, Jr. | .............. | F16L 55/179 |
| 11,009,173 B2 | 5/2021 | Perstnev et al. | | |
| 11,009,175 B2* | 5/2021 | Perstnev | ................ | F16L 55/42 |
| 11,867,337 B2* | 1/2024 | Goligorsky | .......... | C09K 3/1015 |
| 2007/0113622 A1* | 5/2007 | Buckley | ............. | G01M 3/2823 |
| | | | | 73/49 |
| 2013/0213121 A1* | 8/2013 | Sundholm | .......... | B29C 65/7802 |
| | | | | 73/49.5 |
| 2019/0226623 A1 | 7/2019 | Perstnev | | |

FOREIGN PATENT DOCUMENTS

| | | |
|---|---|---|
| WO | 2008081441 A1 | 7/2008 |
| WO | WO 2016/098093 A1 | 6/2016 |

\* cited by examiner

| Description | Porosity |
|---|---|
| Sand; Coarse | 0.26 - 0.43 |
| Sand; Fine | 0.29 - 0.46 |
| Sand/Gravelly Sand; Well Graded; Little to No Fines | 0.22 - 0.42 |
| Sand/Gravelly Sand; Poorly Graded; Little to No Fines | 0.23 - 0.43 |
| Silty Sands | 0.25 - 0.49 |
| Clayey Sands | 0.15 - 0.37 |
| Inorganic Silt/Silty Sand; Slight Plasticity | 0.21 - 0.56 |
| Gravel | 0.23 - 0.38 |
| Gravel/Sandy Gravel; Well Graded; Little to No fines | 0.21 - 0.32 |
| Gravel/Sandy Gravel; Poorly Graded; Little to No fines | 0.21 - 0.32 |
| Gravel/Silty Sandy Gravel | 0.15 - 0.22 |
| Clayey Gravel/Clayey Sandy Gravel | 0.17 - 0.27 |
| Inorganic Silt, Uniform | 0.29 - 0.52 |
| Clay/Silty Clay/Sandy Clay, Low Plasticity | 0.29 - 0.41 |
| Organic Silt/Silty Clay, Low Plasticity | 0.42 - 0.68 |
| Silty Clay/Sandy Clay | 0.2 - 0.64 |
| Inorganic Silt, High Plasticity | 0.53 - 0.68 |
| Inorganic Clay, High Plasticity | 0.39 - 0.59 |
| Organic Clay, High Plasticity | 0.5 - 0.75 |

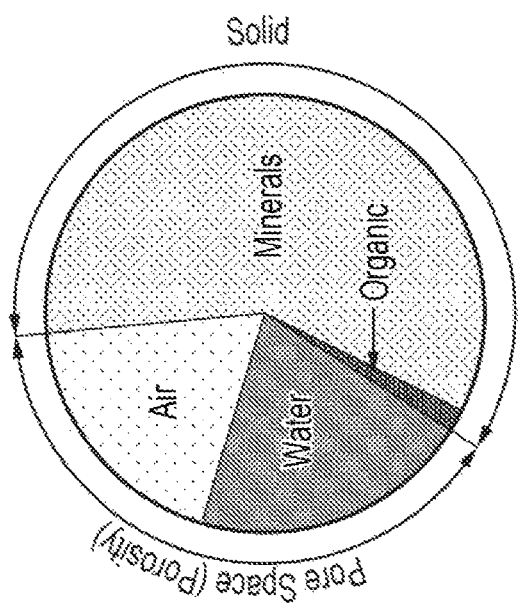

Fig 5

METHOD OF INHIBITING LEAKAGE OF A FLUID THROUGH A DEFECT IN A WALL OF A PIPE

CROSS-REFERENCE TO RELATED APPLICATIONS

This application is a U.S. national stage application under 35 U.S.C. 371 of co-pending International Application No. PCT/GB2021/050818, filed on Apr. 1, 2021, and entitled A METHOD OF INHIBITING LEAKAGE OF A FLUID THROUGH A DEFECT IN A WALL OF A PIPE.

TECHNICAL FIELD

The present invention relates to a method of inhibiting leakage of a fluid, such as a liquid, through a defect in a wall of a pipe, and particularly, although not exclusively, relates to a method of inhibiting leakage of water through a defect in a wall of a water utility pipe buried underground.

BACKGROUND

Leakage of water from utility pipes is a known problem. It is estimated that in the United Kingdom over 59,000 bursts every year in mains pipes. These bursts lead to over 1.1 billion litres of water being lost annually as a consequence of the leaks.

Identifying the precise location of a leak and repairing it is, however, difficult, expensive and leads to large disruption of the water utility network since the pipes typically have to be dug up and replaced. Furthermore, typical repair methods risk contamination of the pipe being repaired.

There is therefore a need for an improved method of sealing leaks in utility pipes which addresses the problems associated with known methods.

SUMMARY OF THE INVENTION

According to a first aspect of the invention there is provided a method of inhibiting leakage of a fluid through a defect in a wall of a pipe, comprising the steps: introducing a loss control medium into a first portion of a pipe; conveying the loss control medium along the pipe from the first portion to a second portion of the pipe, wherein the second portion is which is embedded in a porous medium and has a defect, such as a crack, hole or other aperture, through which fluid conveyed by the pipe during normal use leaks into the porous medium; and applying a pressure to the loss control medium such that at least a portion of the loss control medium is expelled from the pipe through the defect into the porous medium thereby causing the loss control medium to accumulate within the porous medium in the vicinity of the defect which inhibits flow of a liquid through the defect into the porous medium.

In the context of the invention, a porous medium is a medium having small voids (commonly referred to as pores) through which a fluid may seep and so percolate the porous medium. A porous medium, for example, will allow fluid leaking through the defect to permeate the porous medium and so does not form a natural seal against a defect in a pipe wall.

Applying a pressure to the loss control medium so that it is forced through the defect to permeate the porous medium results in the loss control medium permeating the voids within the porous medium adjacent the defect. As the loss control medium accumulates in the porous medium, it progressively inhibits, and may ultimately prevent, further flow of the loss control medium through the defect into the porous medium. The loss control medium may therefore be said to coagulate within the porous medium. Once the rate of flow of the loss control medium through the defect has dropped below a predetermined level or ceased entirely, the defect is considered to be sealed. The loss control medium thereby provides a seal which is external to the pipe which significantly inhibits and may prevent leakage of a fluid through the defect. This prevents any fluid which is subsequently conveyed by the pipe (i.e. the fluid conveyed by the pipe during normal use) from then leaking from the pipe through the defect into the porous medium.

Certain aspects of the invention provide a method of inhibiting leakage of a fluid through a defect in a wall of a pipe which requires minimal intervention so reduces the likelihood of contamination of the pipe and also assures cleanliness following completion. For instance, certain aspects of the invention avoid the need to break containment of a pipe at the region of the pipe having the defect.

Certain aspects of the invention provide a method of inhibiting leakage of a fluid through a defect in a wall of a pipe which is relatively quick compared with conventional methods, and which can be used with buried pipes that are difficult to access since the method does not require digging to access the pipe having the leak.

Certain aspects of the invention provide a method of inhibiting leakage of a fluid through a defect in a wall of a pipe which does not rely on knowing the precise location of a leak.

The loss control medium may comprises a material, such as a liquid, gel, a suspension and/or slurry, which is configured to percolate within a porous medium as it is forced through the porous medium.

The loss control medium may be disposed between a first sealing member and a second sealing member which seal against an inner surface of the pipe and the loss control medium is conveyed to the second portion of the pipe between the first sealing member and the second sealing member.

The loss control medium may be conveyed along the pipe by applying a predetermined pressure to the second sealing member such that the second sealing member, the loss control medium and the first sealing member are conveyed along the pipe to the second portion. Applying a predetermined pressure to the second sealing member creates a net static pressure difference across the second sealing member which propels the first sealing member, loss control medium and second sealing member along the pipe. The pressure may be applied by supplying a fluid, such as a liquid (for, example, water), into the pipe in an upstream region of the pipe. The upstream region of the pipe may be defined as a region of the pipe between the region of the pipe in which the first sealing member, loss control medium and second sealing member are disposed and the first portion of the pipe. The fluid may be a gas, such as air or nitrogen, or a liquid, such as water.

The first and second sealing members may comprise, or consist entirely of, a compliant material which conforms under pressure to an inner surface of the pipe. The compliant material may be incompressible. The compliant material may resilient. For example, the compliant material may be said to have a 'memory' such that it returns to its original size following compression. The compliant material may comprises an elastomer.

The first and second sealing members may be configured to accommodate variations in diameter of a pipe having a circular cross-section of up to 50%. The first and second sealing members may be configured to accommodate variations in the cross-sectional area of a pipe as the sealing members move along a pipe such that they remain in a sealing contact with an inner surface of the pipe. For example, the first and second sealing members may be configured to change shape in order to accommodate bends or T-junctions in a pipe or pipe network.

The loss control medium may be pressurised by urging the first and second sealing members together. The first and second sealing members may be urged together by increasing a pressure difference between the region within the pipe upstream (upstream is rearward with respect to the direction in which the loss control medium is conveyed) of the second sealing member and the region of the pipe downstream (downstream is forward with respect to the direction in which the loss control medium is conveyed) of the first sealing member. Upstream and downstream are defined with respect to the direction in which the loss control medium travels along the pipe as it is being conveyed from the first portion of the pipe to the second portion of the pipe having the defect. For the avoidance of doubt, upstream and downstream do not refer to the direction in which a fluid flows along the pipe during normal use of the pipe, but there may, of course, be concordance.

The loss control medium may comprise at least one fluid and particles of material. The loss control medium may comprise a liquid, gel, a suspension and/or a slurry. The particles may comprise particles of a solid material, such as particles of a polymer material.

The particles material may have a size distribution which corresponds to the size distribution of voids in the porous medium such that as the loss control medium accumulates within the porous medium, the particles become trapped in the voids and so inhibit flow through the voids in the porous medium.

The method may further comprise the step of conveying the loss control medium away from the first pipe portion and subsequently depositing a setting medium, such as a silica based fluid, at a region of the pipe in the vicinity of the defect.

The setting medium may be conveyed along the pipe simultaneously with the loss control medium. The setting medium may, for example, be conveyed in convoy with the loss control medium. The setting medium may be conveyed along the pipe between the second sealing member and a third sealing member. Alternatively, a setting medium may be mixed with the loss control medium.

The method may further comprise the step of conveying the setting medium away from the first pipe portion and subsequently depositing an activation medium for activating the setting medium at a region of the pipe in the vicinity of the defect. The activating medium may be conveyed simultaneously with the loss control medium and the setting medium. The activating medium may, for example, be conveyed in convoy with the loss control medium.

The activating medium may be conveyed along the pipe between the third sealing member and a fourth sealing member or between a second sealing member and a third sealing member for embodiments in which the setting medium is mixed with the loss control medium.

The method may be performed on a pipe section that has been isolated from a pipe system (e.g. a pipe network). The pipe may be a utility water pipe.

According to a second aspect of the invention there is provided a canister comprising: a pipe element having an inner surface; a first sealing member disposed within the pipe element and arranged to seal against the inner surface of the pipe element; a second sealing member disposed within the pipe element and arranged to seal against the inner surface of the pipe element; and a loss control medium disposed between the first sealing member and the second sealing member.

The loss control medium may comprises a material, such as a liquid, gel, a suspension or a slurry, which is configured to accumulate within the porous medium as it percolates the porous medium.

The first sealing member, second sealing member and loss control medium may be arranged to move along the pipe element when a predetermined pressure difference is applied across the first and second sealing members.

The canister may comprise an aperture though which the first sealing member, second sealing member and the loss control medium can be expelled from the canister.

The canister may comprise a connector for connecting the canister to a pipe, such that, when the canister is connected to a pipe, expulsion of the first sealing member, second sealing member and the loss control medium through the aperture moves the first sealing member, second sealing member and the loss control medium into the pipe.

The canister may further comprise a port through which a pressurised fluid, such as a liquid, can be supplied to the pipe element so as to exert a pressure on at least one of the first and second sealing members.

A third sealing member may be disposed within the pipe element and arranged to seal against an inner surface of the pipe element. A setting medium may be disposed between the second sealing member and the third sealing member.

A fourth sealing member may be disposed within the pipe element and arranged to seal against an inner surface of the pipe element. An activation medium may be disposed between the third sealing member and the fourth sealing member.

According to a third aspect of the invention there is provided an apparatus configured to be disposed within a pipe such that the apparatus can be moved along the pipe to perform a maintenance operation on a selected portion of the pipe, the apparatus comprising: a first sealing arrangement having a first sealing element that is actuatable between a non-sealing configuration and a sealing configuration in which, when the apparatus is disposed within a pipe, the first sealing element seals against an inner surface of said pipe, and a second sealing arrangement arranged with respect to the first sealing arrangement such that the second sealing arrangement is spaced from the first sealing arrangement, the second sealing arrangement having a second sealing element that is actuatable between a non-sealing configuration and a sealing configuration in which, when the apparatus is disposed within a pipe, the second sealing element seals against the inner surface of said pipe, wherein the apparatus is arranged such that, when the first and second sealing elements seal against the inner surface of a pipe, a region of the pipe between the first sealing arrangement and the second sealing arrangement is sealed from the remainder of the pipe.

The apparatus may have at least one supply port which is arranged to supply a fluid to a region between the first sealing element and the second sealing element.

The apparatus may further comprise a supply conduit which extends from the supply port through the first sealing arrangement.

The supply conduit may be connectable to at least one source of fluid.

The apparatus may have at least a first drainage port which is arranged to drain fluid from a region between the first sealing element and the second sealing element.

The apparatus may further comprise at least a second drainage port which is arranged to drain fluid from a region between the first sealing element and the second sealing element.

The first drainage port may be disposed adjacent the first sealing arrangement and the second drainage port is disposed adjacent the second sealing arrangement.

At least the first drainage port may be disposed radially outwardly of the supply port with respect to the direction in which the first and second sealing arrangements are spaced.

The apparatus may further comprise a drainage conduit which extends from at least the first drainage port through the first sealing arrangement.

The first and second sealing elements may be independently actuatable. The first and second sealing elements may be hydraulically actuatable. The first and second sealing elements may be inflatable. The first and second sealing elements may be connectable to at least one source of pressurised fluid. The first and second sealing elements may be annular. The apparatus may further comprise a support member arranged to carry the first and second sealing arrangements.

According to a fourth aspect of the invention there is provided a method of performing a maintenance operation on a pipe, the method comprising the steps: arranging the apparatus in accordance with the third aspect of the invention within a pipe such that a region of the pipe having a defect is between the first sealing element and the second sealing element; actuating the first sealing element into the sealing configuration such that the first sealing element seals against an inner surface of said pipe, and actuating the second sealing element into the sealing configuration such that the second sealing element seals against the inner surface of said pipe thereby sealing a region of the pipe between the first sealing arrangement and the second sealing arrangement from the remainder of the pipe.

The method may further comprise the step of supplying at least one fluid to said region between the first sealing arrangement and the second sealing arrangement.

The at least one fluid comprises may comprise an inspection fluid. The inspection fluid may be supplied at a predetermined pressure which is not less than 4 bar. The predetermined pressure may be not greater than 10 bar.

The at least one fluid may comprises a loss control medium. The loss control medium may be supplied at a predetermined pressure which is not greater than 15 bar. The predetermined pressure may be not less than 5 bar. The predetermined pressure may be not greater than 10 bar.

The at least one fluid may comprise a flushing fluid. The flushing fluid may be supplied at a predetermined pressure which is not less than 2 bar. The predetermined pressure may be not greater than 8 bar. The predetermined pressure may be not less than 2 bar and not greater than 6 bar.

The method may further comprise the step of draining the at least one fluid from said region between the first sealing arrangement and the second sealing arrangement. The steps of supplying the inspection fluid, fluid loss control medium and flushing fluid may be carried out sequentially.

According to a fifth aspect of the invention there is provided a method of inspecting a defect in a wall of a pipe, comprising the steps: providing a first sealing arrangement having a first sealing element within a pipe such that the first sealing element seals against an inner surface of said pipe; providing a second sealing arrangement having a second sealing element within the pipe such that the second sealing element seals against the inner surface of the pipe, the second sealing element being spaced from the first sealing element such that a region of the pipe having a defect is between the first sealing arrangement and the second sealing arrangement and said region is sealed from the remainder of the pipe; supplying an inspection fluid to said region between the first sealing arrangement and the second sealing arrangement; monitoring a parameter associated with a flow rate of the inspection fluid being supplied to said region of the pipe between the first sealing arrangement and the second sealing arrangement, and determining the size of the defect based on the monitored parameter. The size of the defect may be defined as a cross-sectional flow area, or other suitable equivalent, through which fluid leaks through the defect.

According to a sixth aspect of the invention there is provided a method of inhibiting leakage of a fluid through a defect in a wall of a portion of a pipe embedded in a porous medium having a defect through which fluid conveyed by the pipe during normal use leaks into the porous medium, the method comprising the steps: providing a first sealing arrangement having a first sealing element within a pipe such that the first sealing element seals against an inner surface of said pipe; providing a second sealing arrangement having a second sealing element within the pipe such that the second sealing element seals against the inner surface of the pipe, the second sealing arrangement being spaced from the first sealing arrangement such that a region of the pipe having a defect is between the first sealing arrangement and the second sealing arrangement and said region is sealed from the remainder of the pipe; supplying a loss control medium to said region between the first sealing arrangement and the second sealing arrangement, and applying a pressure to the loss control medium such that at least a portion of the loss control medium is expelled from the pipe through the defect into the porous medium thereby causing the loss control medium to accumulate within the porous medium in the vicinity of the defect which inhibits flow of a liquid through the defect into the porous medium.

The pressure applied to the loss control medium may be a predetermined pressure which is not greater than 15 bar, for example not greater than 10 bar. The predetermined pressure may be not less than 5 bar.

Various further features and aspects of the invention are defined in the claims.

Unless defined otherwise, all technical and scientific terms used herein have the meaning commonly understood by a person skilled in the art to which this invention belongs.

BRIEF DESCRIPTION OF THE DRAWINGS

Embodiments of the present invention will now be described by way of example only with reference to the accompanying drawings where like parts are provided with corresponding reference numerals and in which:

FIG. 5 shows examples compositions of porous medium and their respective porosities;

DETAILED DESCRIPTION

Figure 1:
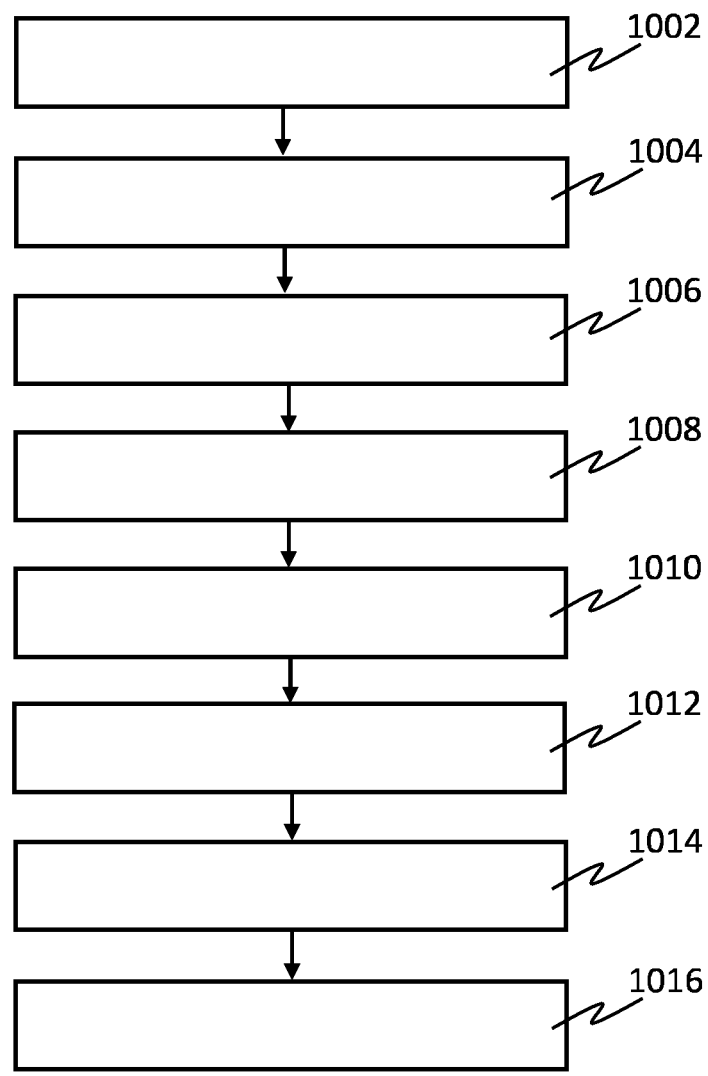
FIG. 1 is a flow chart illustrating steps of a method of inhibiting leakage of fluid through a defect in a wall of a pipe.

FIG. 1 is a flow chart illustrating the steps of a method of inhibiting leakage of a fluid through a defect in a wall of a pipe buried in a porous medium. In particular, FIG. 1 illustrates the steps of a method of inhibiting leakage of water through a wall of an underground water utility pipe.

Figure 2A:
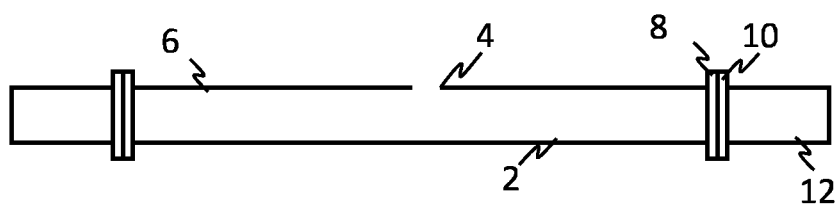
FIGS. 2a, 2b and 2c are schematic illustrations of an apparatus which may be used in accordance with the method illustrated in FIG. 1.

FIG. 2 shows a water utility pipe 2 that is buried in a porous medium, such as the ground, and is known or suspected to have a defect 4 through which water being conveyed by the pipe leaks from the pipe 2.

The pipe 2 is identified as having a defect 4 using, for example, a conventional leak detection method. A pipe section 6 of the pipe 2, such as a pipe section 6 extending between two connectors, which has the defect 4 is also identified. The approximate location of the defect 4 in the pipe section 6 may also be identified. In most circumstances, an approximate location of the defect 4 will be sufficient and so the exact location of the defect 4 need not be determined.

Once the pipe section 6 having the defect 4 has been identified, the pipe section 6 is isolated (Step 1004), for example by closing valves (not shown) within the pipe 2 at each end of the pipe section 6. An end of the pipe section 6 having a connecting flange 8 is then opened, for example by disconnecting the pipe section 6 from a connecting flange 10 of an adjacent section 12 of the pipe 2. In an alternative embodiment, water within the pipe 2 may be frozen at separate sections along the pipe 2 so that the defect 4 is located between the frozen sections. The pipe 2 can then be accessed between the frozen sections, for example to cut away a section of the pipe 2 and fit a connecting flange 10, without having to isolate the other sections of the pipe 2. This would also allow the pipe 2 to be returned to service relatively easily.

Figure 2B:
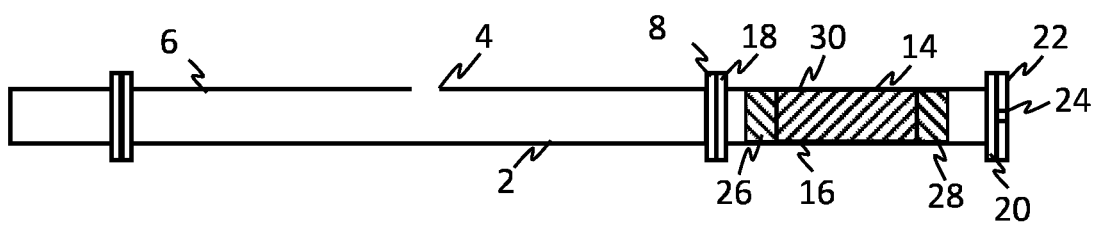

As shown schematically in FIG. 2*b* (and also as an assembled test apparatus in FIG. 4), a canister 14 comprising a pipe element 16, a first connecting flange 18 at one end and a second connecting flange 20 at the other end is secured to the pipe section 6 by connecting the first connecting flange 18 to the pipe connecting flange 8 (Step 1006). A blank flange plate 22 is secured to the second connecting flange 20. The blank flange plate 22 has a canister port 24 to which a source of pressurised fluid, such as a source of pressurised liquid or gas, can be connected.

A first sealing member which forms a front sealing member 26 and a second sealing member which forms a rear sealing member 28 are disposed within the canister 14 and arranged so that the front sealing member 26 is towards the first connecting flange 18 and the rear sealing member 28 is towards the second connecting flange 20. The front and rear sealing members 26, 28 comprise an incompressible elastomeric material which is compliant and so conforms to the internal surface of the pipe element 16 of the canister 14. Both the front and rear sealing members 26, 28 form a fluid-tight seal, in particular a hydraulic seal, against an inner surface of the pipe element 16. Each sealing member 26, 28 can change shape and adapt to a 50% reduction or increase (provided the sealing member is of a sufficient volume relative to the size of the pipe) in the change of diameter of a pipe in which it is located. Each sealing member 26, 28 may also change shape during progression along a pipe to accommodate bends and T-junctions within a pipe or pipe network.

A loss control medium 30 in the form of a fluid comprising particles is disposed between the front and rear sealing members 26, 28 and is sealed between them. The loss control medium 30 comprises a liquid and/or gel having particles of solid material, such as polymer particles or mineral particles, within it. The particles may be suspended within the liquid or gel. The loss control medium may be a suspension or a slurry. The loss control medium may comprise between 28 lb/bbl and 30 lb/bbl of particles. The liquid may comprise surfactants. The loss control medium may be known loss control medium such as the loss control medium supplied by a company called Aubin™ under the name XLoss™.

The front and rear sealing members 26, 28 are known the art of utility water pipes as pigs. In particular, the front and rear sealing members 26, 28 are a particular type of pig which is manufactured by a company called Aubin™ and sold under the name Evo-Pig™. An Evo-Pig™ is chemically inert and so can be used for transport of chemicals along a pipe.

The front and rear sealing members 26, 28 and the loss control medium 30 are typically provided in the canister 14 prior to connection of the canister 14 to the pipe section 6. The canister 14 may, for example, be supplied ready for immediate connection and use. The front and rear sealing member 26, 28 are selected based on the cross-sectional area of the pipe 2. For instance, the size of the sealing members 26, 28 must be sufficient to maintain a seal against the inner surface of the pipe 2 when inserted into the pipe 2 (e.g. the outer diameter of the sealing members 26, 28 must at least match the internal diameter of the pipe 2 into which they are inserted). The amount of loss control medium 30 can also be selected so that there is a sufficient quantity of loss control medium 30 to fill voids in the porous medium such that leakage of fluid through the defect 4 will be inhibited.

The composition of the loss control medium 30 may also be tailored to the porous medium in the vicinity of the defect. For instance, the distribution of particle size within the loss control medium may selected so that the particles are able to permeate the porous medium, but will also become trapped in the voids of the porous medium and so restrict flow through the porous medium and hence inhibit flow through the defect.

Figure 6:
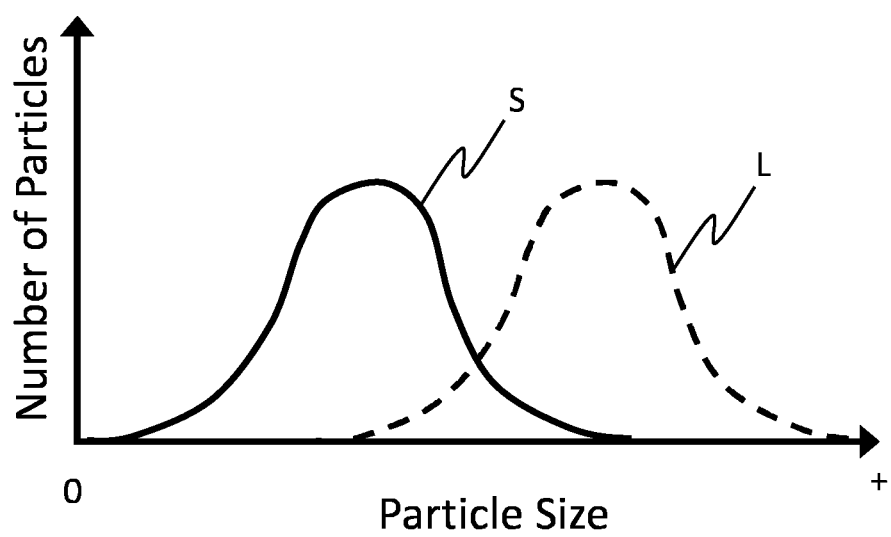
FIG. 6 shows example compositions of a loss control medium which may be selected based on intended application.

Different compositions of the porous medium (e.g. earth) in which a utility water pipe can be expected to be buried are shown in FIG. 5. The porous medium can be considered to comprise four core components including: minerals, earth, water and air. The proportion of each of these and the nature of the substances dictate the porosity of the medium. For example, a porous medium containing mainly coarse sand and gravel can be expected to have a relatively high porosity, whereas a porous medium containing mainly silt and/or clay can be expected to have a relatively low porosity. A loss control medium having a relatively high proportion of relatively large particles (L) would therefore be selected for a pipe buried in sand/gravel, whereas a loss control medium having a higher proportion of relatively small particles (S) would therefore be selected for a pipe buried in clay or silt, as indicated by the particle size distribution profiles shown in FIG. 6. This ensures that an acceptable balance between penetration of the porous medium and occlusion of the voids within the porous medium can be achieved for any particular porous medium.

Figure 2C:
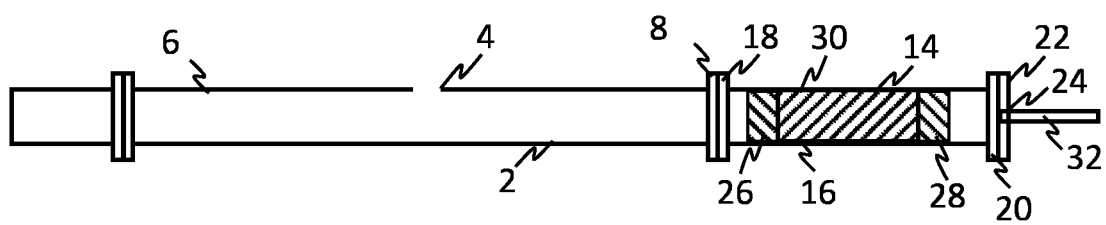
Figure 3:
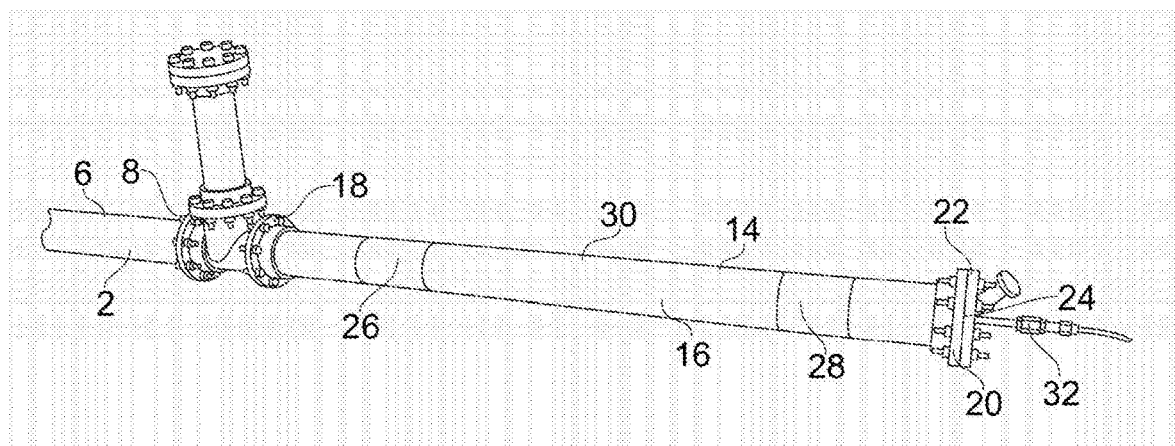
FIG. 3 shows an apparatus which can be used to assist implementation of the method illustrated in FIG. 1.

Once the canister 14 is secured to the pipe section 6, a source of pressurised fluid 32, which for the embodiment described is a source of pressurised water, is connected to the canister port 24, as shown in FIG. 2c (Step 1008). Water is incompressible and so is preferred since it is more controllable and responsive; however, it will be appreciated that alternative sources of pressurised liquids or a pressurised gas, such as nitrogen, could be used.

Figure 4A:
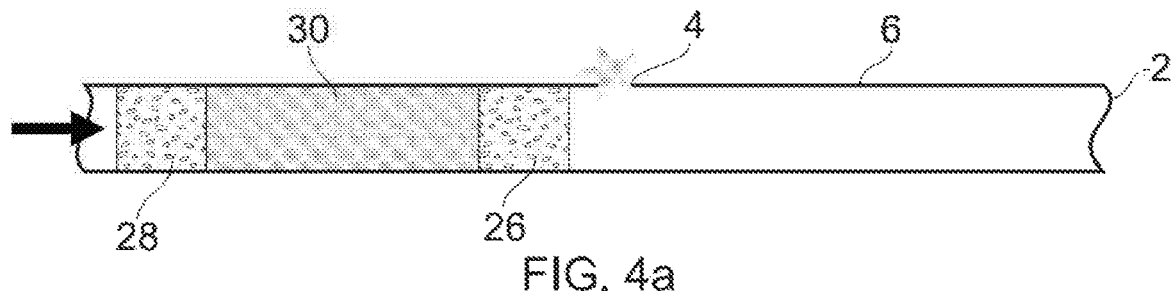
FIGS. 4a, 4b, 4c and 4d are schematic illustrations of steps of the method shown in FIG. 1.

Water is supplied to the canister 14 by the source of pressurised fluid 32 (Step 1010). This increases the pressure acting on the rear sealing member 28 (the upstream pressure) and so exerts a pressure on the rear sealing member 28 which is greater than any pressure acting on the front sealing member 26 in the opposite direction (the downstream pressure). This pressure difference, which is determined depending on requirements, may be considered to be a positive pressure difference across the sealing members 26, 28. The pressure difference forces the front sealing member 26 and rear sealing member 28 together with the loss control medium 30 from the canister 14 into the pipe section 6 to which it is connected, as shown in FIG. 4a. The front sealing member 26 and rear sealing member 28 together with the loss control medium 30 are then conveyed along the pipe section 6 to the portion of the pipe 2 which has the defect 4. The position of the sealing members 26, 28 (and hence the loss control medium 30) can be tracked or calculated depending on preference in order to determine when the arrangement has reached the approximate location of the defect 4. For example, the volume of water supplied into the pipe 2 in order to force the sealing member 26, 28 and the loss control medium 30 along the pipe section 6 may be monitored and used to calculate the distance travelled.

Figure 4B:
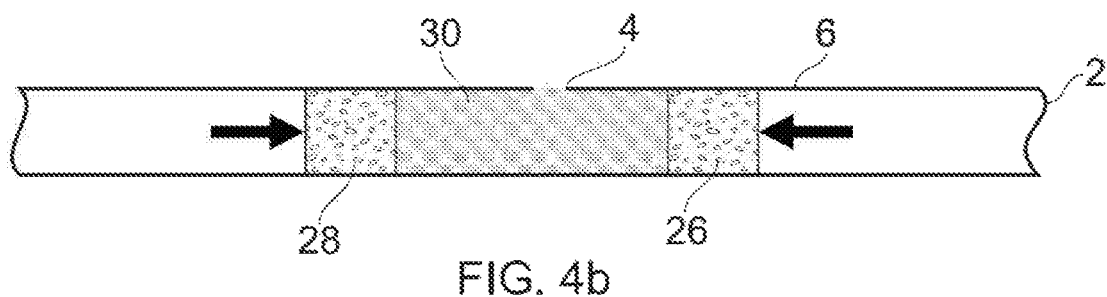

Once the front and rear sealing members 26, 28 and the loss control medium 30 have reached the defective portion of the pipe 2, the front and rear sealing members 26, 28 are halted such that the loss control medium 30 extends along the pipe 2 over the region having the defect 4, as shown in FIG. 4b (Step 1012). The front and rear sealing members 26, 28 may be halted by stopping the supply of water to the canister 14 or by supplying a pressurised fluid at an opposite end of the pipe 2 in order to generate a pressure on the front sealing member 26 (i.e. increase the downstream pressure) which equals the pressure on the rear sealing member 28.

Figure 4C:
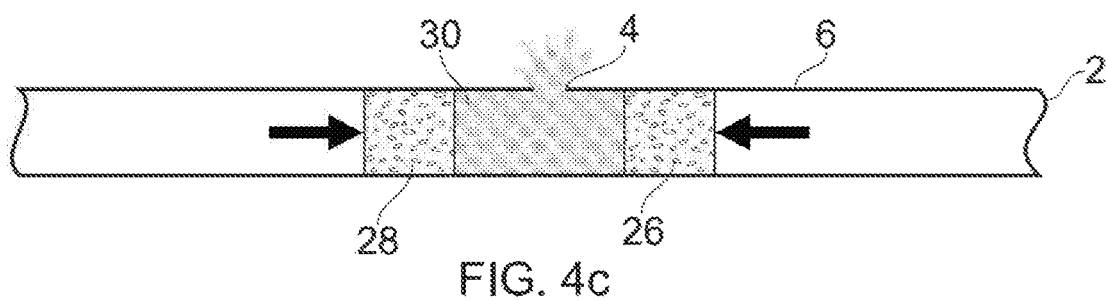

The pressure difference across the front and rear sealing members 26, 28 is then increased in order to urge (i.e. squeeze) the front and rear sealing members 26, 28 towards each other thereby applying a pressure, or else increasing the pressure, on the loss control medium 30 which is a predetermined expulsion pressure (Step 1014). The expulsion pressure will typically be less than 10 bar. In the present embodiment, an exit valve (not shown) downstream of the defect is held open during transport of the loss control medium 30 along the pipe section 6. The region of the pipe section 6 between the front sealing member 26 and the exit valve is filled with a liquid, such as water (this may be water that pre-existed in the pipe 2 prior to isolation). The liquid is thus ejected from the pipe section 6 through the exit valve as the loss control medium moves along the pipe section 6 towards the defect 4. In order to apply the predetermined expulsion pressure, the exit valve is closed and the pressure of the propelling fluid being pumped into the pipe section 6 is increased. This causes the loss control medium 30 to be expelled from the pipe section 6 through the defect 4 into the ground in which the pipe 2 is buried, as shown in FIG. 4c. The ground in which the pipe is buried is a porous medium such as gravel, sand, mixture of both, or other type of material in which utility water pipes may be laid and which is permeable to a fluid, in particular, a material which is permeable to the loss control medium. As the loss control medium 30 is expelled from the pipe 2 it permeates the surrounding porous medium. This causes the loss control medium 30 to permeate the porous medium in the vicinity of the defect 4. Accumulation of the loss control medium 30 externally of the pipe 2 in the vicinity of the defect 4 occludes voids in the porous medium adjacent the aperture formed by the defect 4 and so inhibits leakage of a fluid from the pipe 2 through the defect 4 during normal use.

Figure 4D:
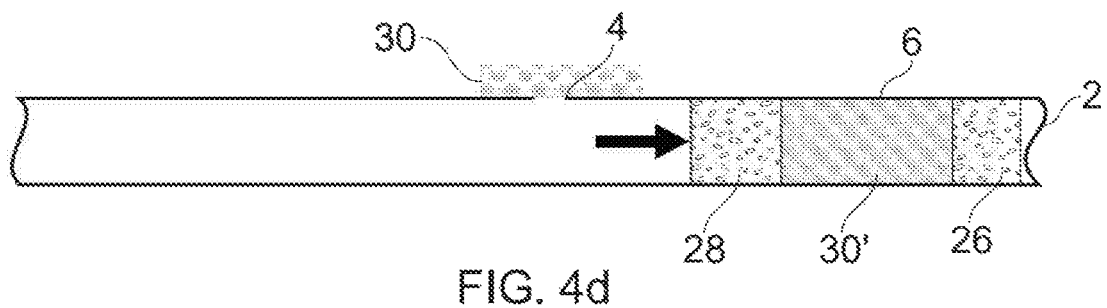

The pressure difference across the front and rear sealing members 26, 28 is then increased (Step 1016), for example by decreasing the pressure acting on the forward sealing member 26, to create a net positive pressure that moves the front sealing member 26, rear sealing member 28 and any residual unused loss control medium along the pipe 2 for removal from the pipe 2, as shown in FIG. 4d.

In an alternative embodiment, the loss control medium 30 may be conveyed whilst being held under a predetermined pressure that is sufficient for the loss control medium 30 to be expelled through any defect 4 that is encountered as it travels along the pipe 2. It is therefore unnecessary to identify the location of a defect 4 in the pipe section 6 along which the loss control medium 30 is conveyed since the loss control medium 30 will be automatically expelled through any defect 4 encountered and so seal the or each defect 4 in the pipe 2. Furthermore, the arrival of the front and rear sealing members 26, 28 and the loss control medium 30 at a defect 4 can be can be determined by monitoring the pressure of the loss control medium 30 between the sealing members 28, 28 since a sudden reduction in pressure would indicate an escape of loss control medium 30 through a defect and so indicate that a defect has been reached. In a further embodiment, sensors could be provided, such as transmitters in the sealing members 26, 28, together with an aerial disposed in or proximate the pipe, which allow the distance between the sealing members 26, 28 to be monitored. A sudden reduction in distance between the sealing members 26, 28 could indicate an escape of loss control medium 30 and that a defect has been reached.

In an alternative embodiment, a gas, such as air or nitrogen, may be used to convey the sealing members 26, 28 and the loss control medium 30 along the pipe 2 instead of a liquid.

Figure 7:
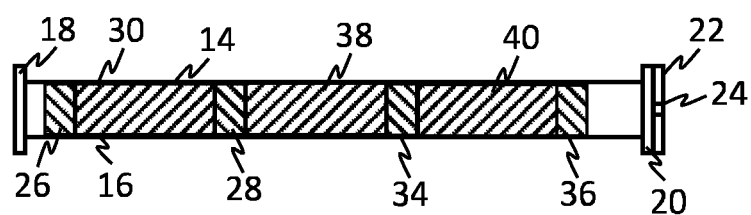
FIG. 7 is a schematic illustration of an apparatus which may be used in accordance with an further method of inhibiting leakage of fluid through a defect in a wall of a pipe.

In a further embodiment shown in FIG. 7, a third sealing member 34 is disposed within a cartridge 14 behind the rear sealing member 28 and a fourth sealing member 36 is disposed within a cartridge 14 behind the third sealing member 28. A setting medium 38, such as a silica-based fluid, is disposed between the rear sealing member 28 and the third sealing member 34. An activation medium 40, such as an acid, is disposed between the third sealing member 34 and the fourth sealing member 36.

The further embodiment is introduced and propelled along a pipe 2 in the same manner as the embodiment described with respect to FIGS. 1 to 4. However, as the loss control medium 30 is moved away from the defect 4, the setting medium 38 is brought into the vicinity of the defect 4 such that setting medium 38 is deposited on the defect and/or the loss control medium 30 which seals the defect 4. The setting medium 38 is then moved away from the defect 4 as the loss control medium 30 is moved further along the pipe 2 which brings the activation medium 40 into contact with the setting medium 38. Once activated by the activation medium 40, the setting medium 38 provides more robust sealing, which may be considered to be a permanent seal, of the defect 4 than the loss control medium 30 alone.

In a further embodiment, the setting medium may be a wax, such as particles of wax. The particles of wax may be transported separately or mixed with the loss control medium. The wax may be subsequently activated (e.g. melted) by apply heat locally, for example by transporting a device or a substance, between two seal members, as described above, which can be made to undergo an exothermic reaction which melts the wax. Re-solidification of the wax forms a bonded substance that inhibits flow through the porous medium and so seals the defect.

Figure 8:
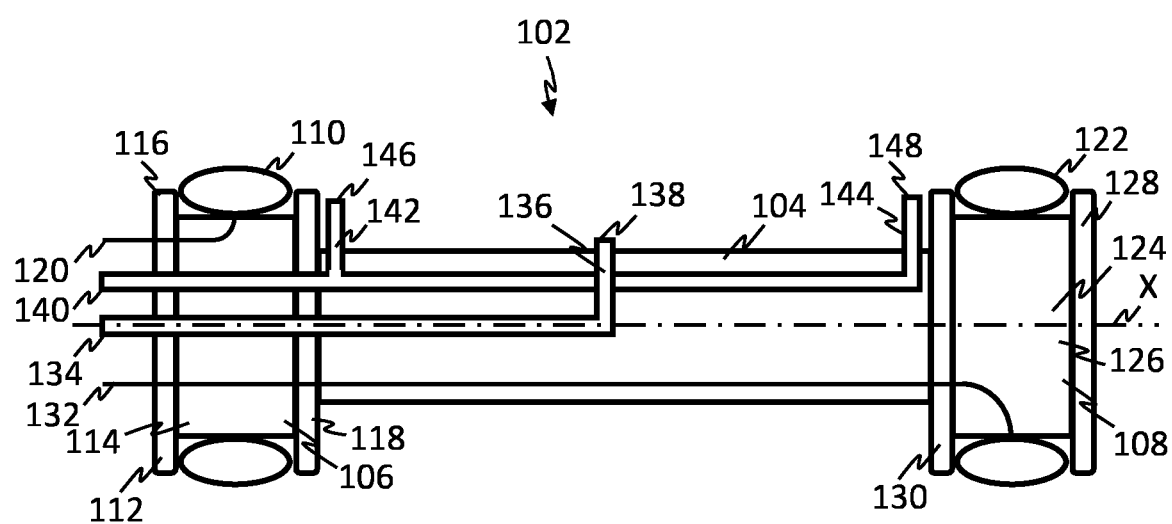
FIG. 8 shows an apparatus for performing a maintenance operation on a pipe.

FIG. 8 shows an apparatus 102 for performing a maintenance operation on a pipe, such as inspection of a pipe for defects through which a fluid leaks from a pipe and/or inhibiting leakage of the fluid through a defect.

The apparatus 102 comprises a support member 104 having a cylindrical support body 105, a first sealing arrangement 106 at one end of the support body 105, and a second sealing arrangement 108 at the other end of the support body 105. The support member 104 has a longitudinal axis X.

The first sealing arrangement 106 comprises a first inflatable sealing element 110 and a first support element 112. The support element 112 comprises a first cylindrical body 114 and first and second retaining flanges 116, 118 arranged to retain the first inflatable sealing element 110 on the first support element 112. The first inflatable sealing element 110 is annular and extends around the first cylindrical body 114 between the first and second retaining flanges 116, 118.

The first inflatable sealing element 110 is connected to a first inflation pipe 120 for supplying a pressuring fluid, such as air or water, to the first inflatable sealing element 110. The first inflation pipe 120 extends from the first inflatable sealing element 110 through the first support element 112 to a source of pressuring fluid.

The second sealing arrangement 108 comprises a second inflatable sealing element 122 and a second support element 124. The second support element 124 comprises a second cylindrical body 126 and third and fourth retaining flanges 128, 130 arranged to retain the second inflatable sealing element 122 on the second support element 124. The second inflatable sealing element 122 is annular and extends around the second cylindrical body 126 between the second and third retaining flanges 128, 130.

The second inflatable sealing element 122 is connected to a second inflation pipe 132 for supplying a pressurising fluid, such as air, to the second inflatable sealing element 122. The second inflation pipe 132 extends from the second inflatable sealing element 122 through the second support element 124, along the support body 105 and through the first support element 112 to a source of pressuring fluid.

The support member 104 is provided with a supply pipe 134 having a radially extending portion 136 which defines a supply port 138 that faces outwardly from the support member 104 and is disposed between the first and second sealing arrangements 106, 108. The supply pipe 134 extends from the supply port 138 through the support body 105 and through the first support element 112.

The support member 104 is further provided with a drainage pipe 140 having a first radially extending portion 142 and a second radially extending portion 144.

The first radially extending portion 142 extends outwardly adjacent the first sealing arrangement 106. The first radially extending portion 142 defines a first drainage port 146 that faces outwardly and is disposed between the first and second sealing arrangements 106, 108. The first drainage port 146 is proximate the first sealing arrangement 106.

The second radially extending portion 144 extends outwardly adjacent the second sealing arrangement 108. The second radially extending portion 144 defines a second drainage port 148 that faces outwardly and is disposed between the first and second sealing arrangements 106, 108 and is proximate the second sealing arrangement 108.

The drainage pipe 140 extends from the first and second drainage ports 146, 148 through the support body 105 and through the first support element 112.

The first and second inflation pipes 120, 132, supply pipe 134 and the drainage pipe 140 may be provided with suitable connectors for connecting the respective pipes to tubes/umbilicals that connect to respective sources of fluid for inflation and maintenance operations.

Figure 9:
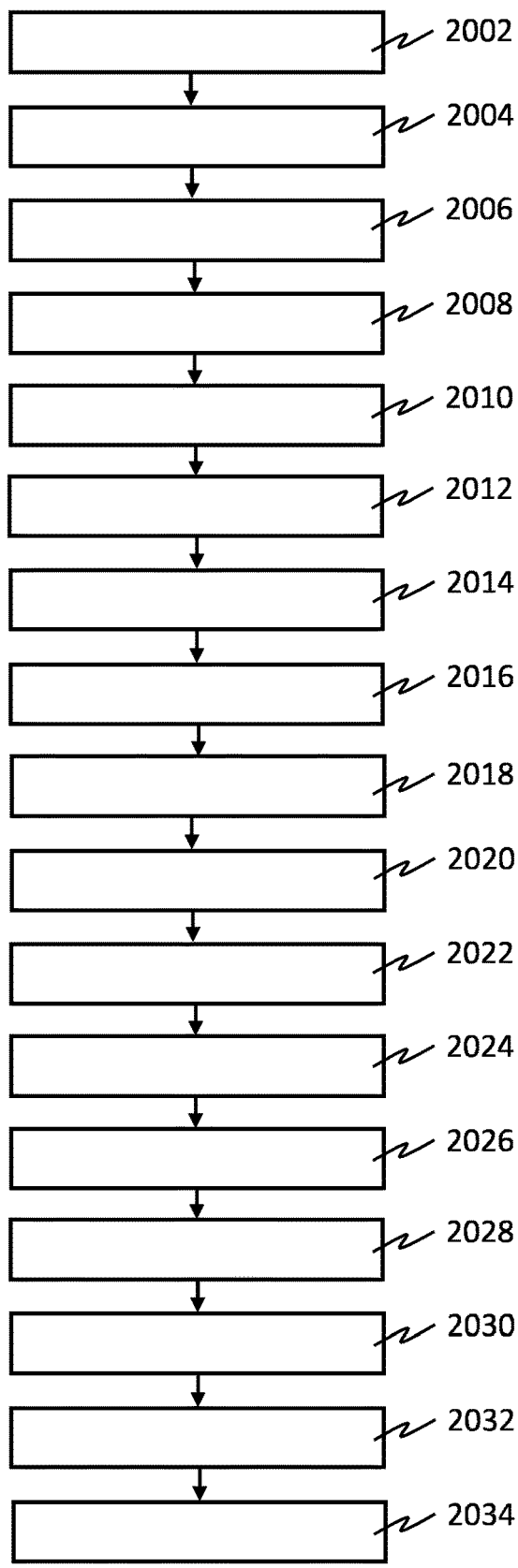
FIG. 9 is a flow chart illustrating steps of a method of inspecting a pipe for a defect and for sealing the defect.

FIG. 9 is a flow chart illustrating the steps of a method of inspecting a pipe for a defect and for subsequently sealing the defect to inhibiting leakage of fluid through the defect.

Pipe Inspection

Figure 10A:
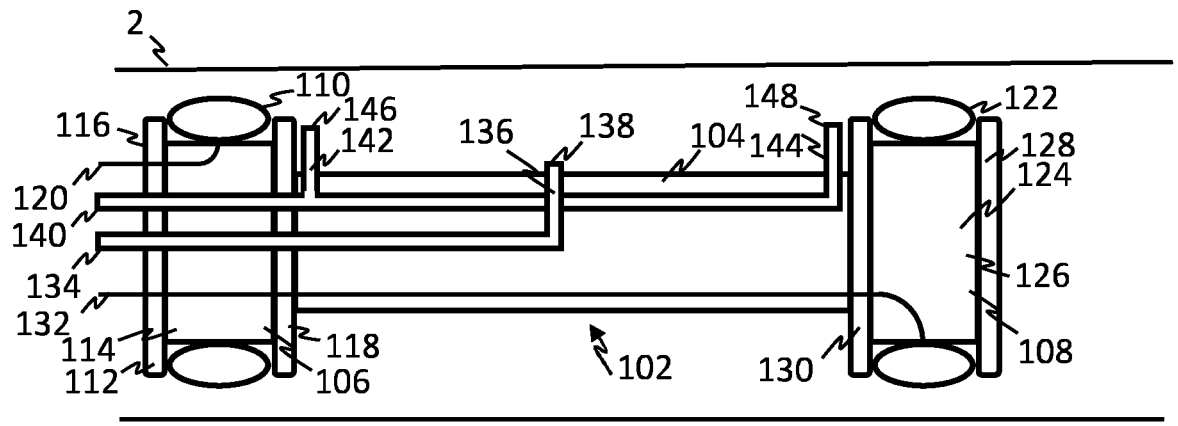
FIGS. 10*a* to 10*d* show the apparatus shown in FIG. 8 being used to inspect a pipe.

In order to determine a location of a defect in a pipe 2 through which a fluid, such as water, being conveyed by the pipe leaks from the pipe 2, the apparatus 102 is inserted into an end of the pipe 2 (or an accessible opening in the pipe 2), as shown in FIG. 10a (Step 2002). The apparatus 102 is arranged within the pipe 2 such that the first sealing arrangement 106 provides a rear sealing member and the second sealing arrangement 108 provides a front sealing member.

Figure 10B:
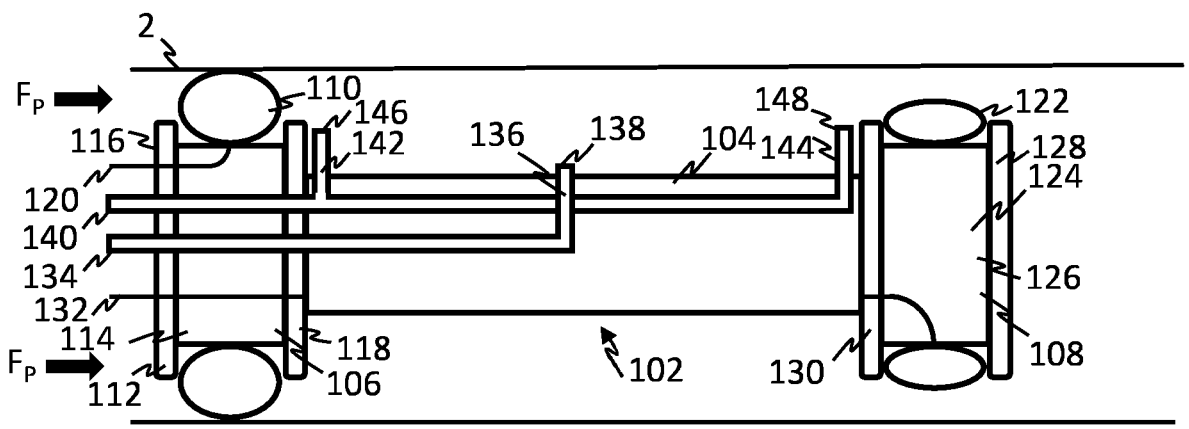

The first inflatable sealing element 110 is then actuated by supplying a pressuring fluid, such as air or water, along the first inflation pipe 120 to inflate the first inflatable sealing element 110 (Step 2004). The pressuring fluid is supplied to the first inflatable sealing element 110 until the first inflatable sealing element 110 makes contact with an inner surface of the pipe, as shown in FIG. 10b, and the inflation pressure reaches a predetermined deployment pressure. The predetermined deployment pressure is a pressure which is sufficient to maintain a seal against the inner surface of the pipe 2 as the apparatus 102 is moved along the pipe. The deployment pressure may be not less than 0.1 bar and not greater than 5 bar, preferably not less than 0.5 and not greater than 2 bar, and typically 1 bar. The deployment pressure is set to provide sufficient sealing contact with the inner surface of the pipe 2 to maintain a seal as the apparatus 102 is moved along the pipe 2 while allowing the apparatus 102 to be propelled along the pipe 2 as described below.

A propulsive fluid $F_P$, such as water, is supplied upstream of the apparatus—i.e. to the rear of the first inflatable sealing element 110 (Step 2006). The propulsive fluid $F_P$ exerts a pressure on the first sealing arrangement 106 which exceeds the downstream pressure. The resulting pressure difference, which is above a predetermined pressure difference, is sufficient to propel the apparatus 102 along the pipe. The pressure difference may be not less than 0.1 bar and not greater than 6 bar, and typically 2 bar.

Figure 10C:
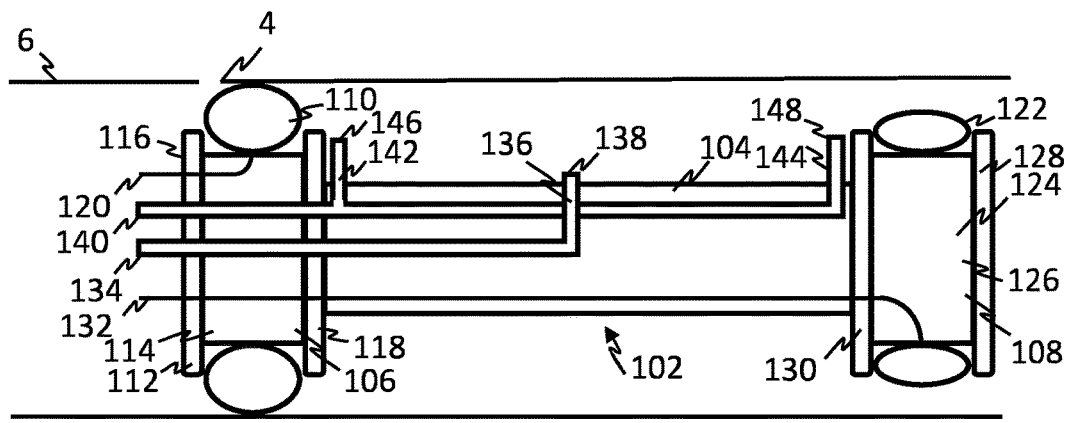

As the first inflatable sealing element 110 passes a defect 4 in a section of the pipe 6, as shown in FIG. 10c, the propulsive fluid escapes through the defect. This results in a reduction in pressure of the propulsive fluid upstream of the apparatus and/or an increase in flow rate. In some circumstances, the velocity of the apparatus 102 along the pipe may reduce (i.e. the apparatus 102 will slow down) and the apparatus 102 may stop. Any one of these parameters can be monitored to determine the presence of a suspected defect 4.

In order to confirm the presence and location of a leak, the apparatus 102 is moved back along the pipe 2 so that the defect 4 is between the first sealing arrangement 106 and the second sealing arrangement 108 (Step 2008). The apparatus 102 may be pulled back along the pipe 2 by a winching device connected to the apparatus 102 by a tether, not shown. The apparatus 102 is moved, for example, by a distance which is greater that the width of the first sealing arrangement 106 and less than the distance from the distance between the first and second inflatable sealing elements 110, 122. The apparatus 102 thus 'straddles' the defect 4.

Figure 10D:
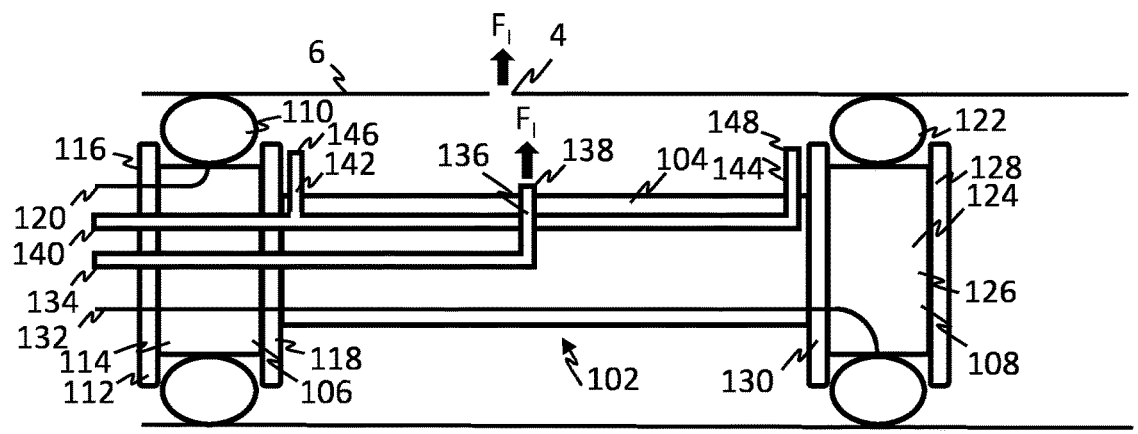

The second inflatable sealing element 122 is then actuated by supplying a pressurising fluid, such as air or water, along the second inflation pipe 132 to inflate the second inflatable sealing element 122 (Step 2010). The pressuring fluid may be supplied by a source of pressuring fluid which is external the pipe 2 and conveyed along the pipe 2 by a tube/umbilical connected to the second inflation pipe 132. The pressuring fluid is supplied to the second inflatable sealing element 122 until the second inflatable sealing element 122 makes contact with an inner surface of the pipe, as shown in FIG. 10d, and the inflation pressure reaches a predetermined inspection pressure. The predetermined inspection pressure is a pressure which is sufficient to maintain a seal against the inner surface of the pipe 2 for a subsequent leak inspection operation. The inspection pressure is therefore related to the pressure of an inspection fluid used to inspect the defect. The inspection pressure may be not less than 2 bar and 15 bar, preferably not less than 2 bar and not greater than 10 bar, particularly when inspecting mains water pipes or mains sewage pipes. If air is used as the pressurising fluid, a typical inspection pressure is not less than 4 bar and not greater than 7 bar, such as 7 bar. If water is used as the pressurising fluid, a typical inspection pressure is 5 bar. The predetermined inspection pressure is greater than the predetermined deployment pressure to which the first inflatable sealing element 110 is inflated. The inflation pressure of the first inflatable sealing element 110 is increased to the predetermined inspection pressure by supplying further pressuring fluid to the first inflatable sealing element 110 as described previously (Step 2012). The pressuring fluid may be supplied by a source of pressuring fluid which is external the pipe 2 and conveyed along the pipe 2 by a tube/umbilical connected to the first inflation pipe 120.

The first and second sealing arrangements 106, 108 together define a sealed space between them and the inner surface of the pipe 2 in which the defect 4 is present.

An inspection fluid $F_I$, such as water, is introduced through the supply port 138 to the sealed space between the first and second sealing arrangements 106, 108 (Step 2014). The inspection fluid $F_I$ may be supplied by a source of inspection fluid which is external the pipe 2 and conveyed along the pipe 2 by a tube/umbilical connected to the supply pipe 134. The inspection fluid $F_I$ floods the sealed space. As the sealed spaced is flooded, the inspection fluid $F_I$ begins to flow out of the pipe 2 through the defect 4. The pressure of the inspection fluid $F_I$ is increased to a predetermined inspection pressure. The predetermined inspection pressure may be not less than 4 bar and not greater than 10 bar, and typically 6 bar. Once the flow rate has stabilised, the flow rate can be used to determine the flow rate of fluid through the defect, and so determine whether the defect needs to be sealed (Step 2016). For example, a steady flow rate of between a first predetermined flow rate (l/min) and a second predetermined flow rate (l/min) indicates that there is a defect that needs to be sealed. The flow rate may be used to determine an approximate size of the defect which may be defined in terms of an equivalent cross-sectional flow area ($m^2$). Flow through the drainage ports 146, 148 is prevented during inspection; for example, by closing a valve in the supply connected to the drainage pipe 140.

Defect Sealing

Figure 11A:
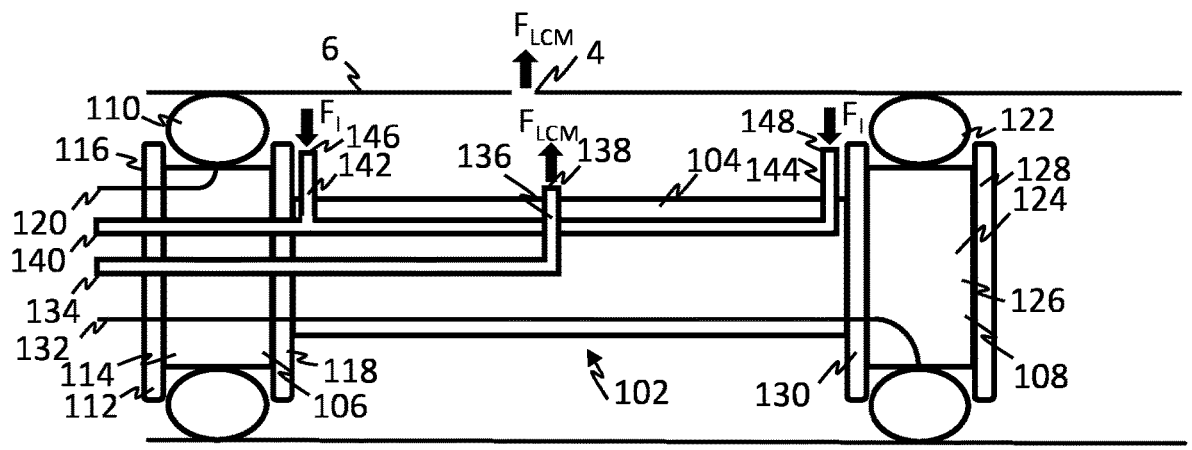
FIGS. 11*a* to 11*d* show the apparatus shown in FIG. 8 being used to inhibit leakage of a fluid through a defect in a pipe.

Once inspection is complete, flow through the drainage ports 146, 148 is enabled; for example, by opening a valve in the supply connected to the drainage pipe 140 (Step 2018). A loss control medium $F_{FLC}$, such as a loss control medium as describe with respect to FIGS. 1 to 7 is then supplied to the sealed space via the supply port 138, as shown in FIG. 11a (Step 2020). The loss control medium $F_{FLC}$ is supplied by a source of loss control medium $F_{FLC}$ which is external the pipe 2 and conveyed along the pipe 2 by the tube/umbilical connected to the supply pipe 134. The loss control medium $F_{FLC}$ displaces the inspection fluid $F_I$ from the sealed space through the defect 4 and out of the first and second drainage ports 146, 148. The drained fluid may be conveyed along and out of the pipe 2 by a tube/umbilical connected to the drainage pipe 140.

Figure 11B:
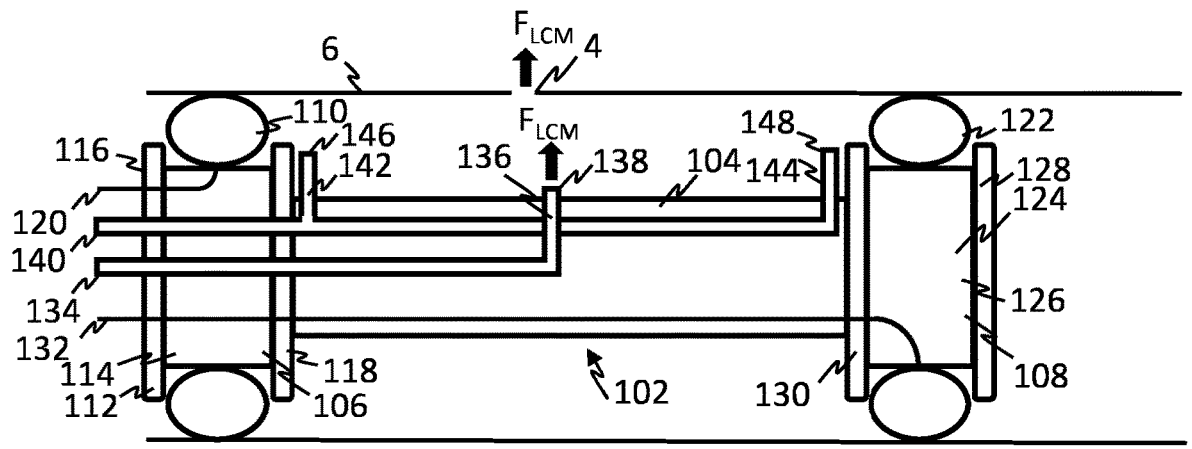

Once it is determined that the sealed space is flooded substantially with the loss control medium $F_{FLC}$, flow through the drainage ports 146, 148 is prevented, as shown in FIG. 11b (Step 2022). It may be determined that the sealed space is flooded substantially with the loss control medium $F_{FLC}$ by monitoring the fluid discharged through the drainage pipe 140 for the presence of the loss control medium $F_{FLC}$. The loss control medium $F_{FLC}$ is typically supplied at a pressure of 0.5 bar. The drainage ports 146, 148 are disposed radially such that the loss control medium $F_{FLC}$ is only discharged the drainage ports 146, 148 when the chamber is substantially filled with the loss control medium $F_{FLC}$. The pressure of the loss control medium $F_{FLC}$ is increased to a predetermined sealing pressure, such that the loss control medium $F_{FLC}$ continues to flow through the defect 4 until the defect 4 has been sealed, as described with respect to FIGS. 1 to 7 (Step 2024). The predetermined sealing pressure may be not less than 5 bar and not greater than 15 bar, and typically 10 bar.

Figure 11C:
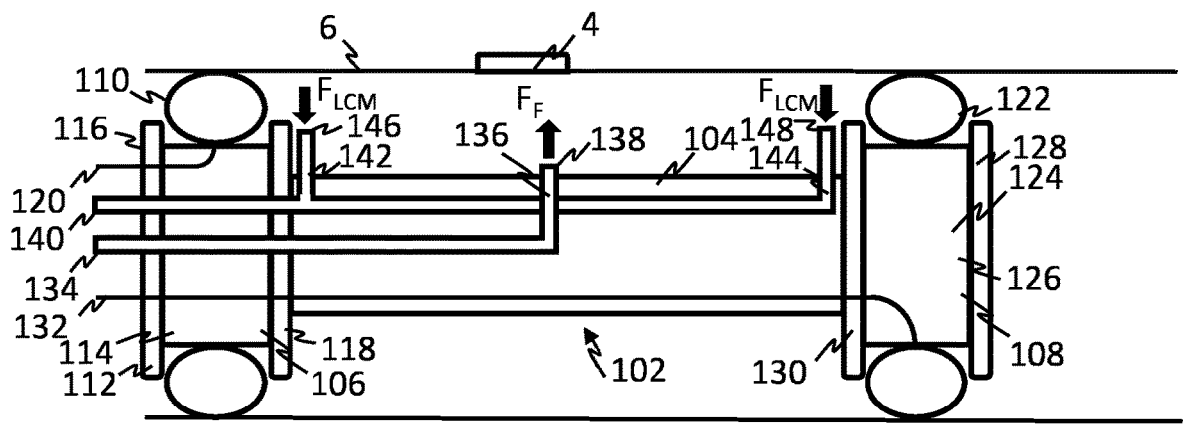
Figure 11D:
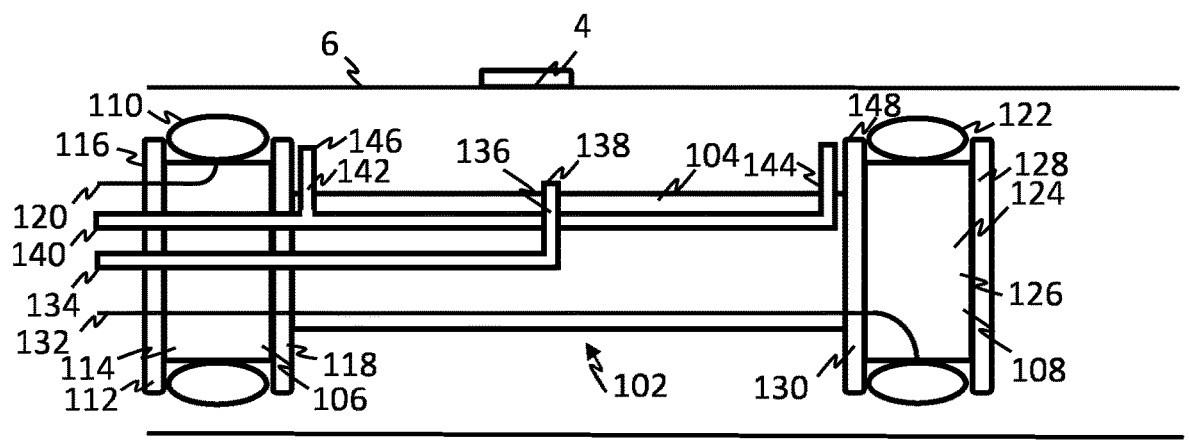

Flow through the drainage ports 146, 148 is then enabled, and the loss control medium $F_{FLC}$ is flushed from the sealed space using a flushing fluid $F_F$, such as water, supplied via the supply port 138, as shown in FIG. 11c (Step 2026). The flushing fluid $F_F$ is supplied by a source of flushing fluid $F_F$ which is external the pipe 2 and conveyed along the pipe 2 by the tube/umbilical connected to the supply pipe 134. Flow through the drainage ports 146, 148 is then disabled again and the pressure of the of the flushing fluid $F_F$ increased to a test pressure, such as a pressure of not less than 2 bar and not greater than 8 bar, such as not less than 2 bar and not greater than 6 bar, and typically 6 bar (Step 2028). Supply of the flushing fluid $F_F$, is stopped and the pressure monitored to determine whether sealing of the defect 4 has been successful (Step 2030). Provided the pressure does not vary by a predetermined amount over a predetermined period of time, sealing of the defect may be determined as successful.

The first and second sealing elements 110, 122 are then deflated; for example, by opening vent valves in the respective supplies to connected to the first and second inflation pipes 120, 132 (Step 2032). Any remaining flushing fluid $F_F$ escapes past the first and second sealing elements 110, 122. The apparatus 102 is then removed from the pipe; for example, using a winching device connected to the apparatus 102 by a tether (Step 2034).

It will appreciated that if the size of the leak through the defect need not be determined, Step 2002 to Step 2012 and Step 2018 to Step 2034 could be performed independently. Furthermore, if the location of the defect is known or need not be determined, the Step 2002 to Step 2006 can be performed independently to move the apparatus to a desired location, and Step 2010, Step 2012 and Steps 2018 to 2034 performed to seal the defect. The skilled person would realise that other selected steps could be performed in order to carry out one or more or parts thereof of a pipe maintenance operation.

It will be appreciated that the apparatus 102 could be used to carry out a pipe maintenance operation, such as inspection of a pipe for defects through which a fluid leaks from a pipe and/or inhibiting leakage of the fluid through a defect, on a pipe buried in a porous medium or a pipe which extends through air or is surrounded by a non-porous medium. For instance, the apparatus 102 may be used to carry out a sealing operation using a conventional sealant to seal a defect in a pipe whether it is surrounded by a porous medium or not.

In alternative embodiments, the first inflatable sealing element and/or the second inflatable sealing element may be replaced by mechanically actuatable sealing elements. For example, each sealing element may comprise a resilient material, such as an elastomeric material, that is compressed or released from compression in order to actuate the sealing element from a non-sealing configuration to a sealing configuration. Such arrangement may include a resilient sealing element which is compressed within a tapered (e.g. conical) element, the tapered element being slid away from the resilient sealing element to allow the resilient sealing element to expand. The resilient sealing element is thus actuated the from a non-sealing configuration to a sealing configuration. Alternatively, a resilient sealing element may be held captive between two compressing elements which compress the resilient sealing element between them to actuate the resilient sealing element from a non-sealing configuration to a sealing configuration. Other suitable arrangements could also be used.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

It will be appreciated that the sealing members may comprises other means that seal a body or slug of loss control medium between them.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" or "comprising" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A method of inhibiting leakage of a fluid through a defect in a wall of a pipe, comprising the steps:
   introducing a loss control medium into a first portion of a pipe;
   conveying the loss control medium along the pipe from the first portion to a second portion of the pipe, wherein the second portion is embedded in a porous medium and has a defect through which fluid conveyed by the pipe during normal use leaks into the porous medium; and
   applying a pressure to the loss control medium such that at least a portion of the loss control medium is expelled from the pipe through the defect into the porous medium thereby causing the loss control medium to accumulate within the porous medium in the vicinity of the defect, wherein the loss control medium within the porous medium inhibits flow of a liquid into the porous medium after the liquid has passed through the defect.

2. The method of claim 1, wherein the loss control medium comprises a material which is configured to percolate within a porous medium as said material is forced through the porous medium.

3. The method of claim 1, wherein the loss control medium is disposed between a first sealing member and a second sealing member which seal against an inner surface of the pipe and the loss control medium is conveyed to the second portion of the pipe between the first sealing member and the second sealing member.

4. The method of claim 3, wherein the loss control medium is conveyed along the pipe by applying a predetermined pressure to the second sealing member such that the second sealing member, the loss control medium and the first sealing member are conveyed along the pipe to the second portion.

5. The method of claim 3, wherein the first and second sealing members comprise a compliant material which conforms under pressure to an inner surface of the pipe.

6. The method of claim 5, wherein the compliant material is incompressible.

7. The method of claim 5, wherein the compliant material is resilient.

8. The method of claim 5, wherein the compliant material comprises a flexible elastomer.

9. The method of claim 3, wherein the first and second sealing members are configured to accommodate variations in diameter of a pipe having a circular cross-section of up to 50%.

10. The method of claim 3, wherein the loss control medium is pressurized by urging the first and second sealing members together.

11. The method of claim 10, wherein the first and second sealing members are urged together by increasing a pressure difference between the region within the pipe upstream of the second sealing member and the region of the pipe downstream of the first sealing member.

12. The method of claim 1, wherein the loss control medium comprises at least one fluid and particles of material.

13. The method of claim 12, wherein the particles of material have a size distribution which corresponds to the size distribution of voids in the porous medium such that as the loss control medium accumulates within the porous medium, the particles become trapped in the voids and so inhibit flow through the voids in the porous medium.

14. The method of claim 1, further comprising the step of conveying the loss control medium away from the first pipe portion and subsequently depositing a setting medium at a region of the pipe in the vicinity of the defect.

15. The method of claim 14, wherein the setting medium is conveyed along the pipe simultaneously with the loss control medium.

16. The method of claim 15, wherein the setting medium is conveyed along the pipe between the second sealing member and a third sealing member.

17. The method of claim 16, wherein the activating medium is conveyed along the pipe between the third sealing member and a fourth sealing member.

18. The method of claim 14, further comprising the step of conveying the setting medium away from the first pipe portion and subsequently depositing an activation medium for activating the setting medium at a region of the pipe in the vicinity of the defect.

19. The method of claim 18, wherein the activating medium is conveyed simultaneously with the loss control medium and the setting medium.

20. The method of claim 1, wherein the method is performed on a pipe section that has been isolated from a pipe system.

21. The method of claim 1, wherein the pipe is a utility water pipe.

22. A method of inspecting a defect in a wall of a pipe, comprising the steps:
  providing a first sealing arrangement having a first sealing element within a pipe such that the first sealing element seals against an inner surface of said pipe;
  providing a second sealing arrangement having a second sealing element within the pipe such that the second sealing element seals against the inner surface of the pipe, the second sealing element being spaced from the first sealing element such that a region of the pipe having a defect is between the first sealing arrangement and the second sealing arrangement and said region is sealed from the remainder of the pipe;
  supplying an inspection fluid to said region between the first sealing arrangement and the second sealing arrangement;
  monitoring a parameter associated with a flow rate of the inspection fluid being supplied to said region of the pipe between the first sealing arrangement and the second sealing arrangement, and
  determining the size of the defect based on the monitored parameter.

23. A method of inhibiting leakage of a fluid through a defect in a wall of a portion of a pipe embedded in a porous medium having a defect through which fluid conveyed by the pipe during normal use leaks into the porous medium, the method comprising the steps:
  providing a first sealing arrangement having a first sealing element within a pipe such that the first sealing element seals against an inner surface of said pipe;
  providing a second sealing arrangement having a second sealing element within the pipe such that the second sealing element seals against the inner surface of the pipe, the second sealing arrangement being spaced from the first sealing arrangement such that a region of the pipe having a defect is between the first sealing arrangement and the second sealing arrangement and said region is sealed from the remainder of the pipe;
  supplying a loss control medium to said region between the first sealing arrangement and the second sealing arrangement, and
  applying a pressure to the loss control medium such that at least a portion of the loss control medium is expelled from the pipe through the defect into the porous medium thereby causing the loss control medium to accumulate within the porous medium in the vicinity of the defect which inhibits flow of a liquid through the defect into the porous medium.

* * * * *